United States Patent
Didillon et al.

(10) Patent No.: US 6,896,795 B2
(45) Date of Patent: *May 24, 2005

(54) PROCESS FOR THE PRODUCTION OF GASOLINES WITH LOW SULFUR CONTENTS

(75) Inventors: Blaise Didillon, Rueil Malmaison (FR); Denis Uzio, Marly le Roi (FR); Nathalie Marchal, Saint Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 423 days.

This patent is subject to a terminal disclaimer.

(21) Appl. No.: 10/109,850

(22) Filed: Apr. 1, 2002

(65) Prior Publication Data

US 2002/0153280 A1 Oct. 24, 2002

Related U.S. Application Data

(63) Continuation of application No. 09/628,177, filed on Jul. 28, 2000, now abandoned.
(60) Provisional application No. 60/154,036, filed on Sep. 16, 1999.

(30) Foreign Application Priority Data

Aug. 19, 1999 (FR) .............................. 99 10653

(51) Int. Cl.$^7$ .............. C10G 45/02; C10G 65/06; C10G 65/04
(52) U.S. Cl. .............. 208/57; 208/97; 208/210; 208/189; 208/216 R; 208/217
(58) Field of Search ............ 208/57, 97, 210, 208/189, 216 R, 217, 92, 243, 244

(56) References Cited

U.S. PATENT DOCUMENTS

| | | |
|---|---|---|
| 2,908,626 A | 10/1959 | Poll |
| 2,983,669 A | 5/1961 | Noll |
| 3,666,659 A | 5/1972 | Carlson et al. |
| 4,062,762 A | 12/1977 | Howard et al. |
| 4,397,739 A | 8/1983 | Jacquin et al. |
| 4,990,242 A | 2/1991 | Louie et al. |
| 5,318,690 A | 6/1994 | Fletcher et al. |
| 5,409,596 A | 4/1995 | Fletcher et al. |
| 5,597,476 A | 1/1997 | Hearn et al. |
| 5,906,730 A | 5/1999 | Hatanaka et al. |
| 5,985,136 A | 11/1999 | Brignac et al. |
| 6,007,704 A | 12/1999 | Chapus et al. |
| 6,017,443 A | 1/2000 | Buchanan |
| 6,024,865 A | 2/2000 | Alexander et al. |
| 6,090,270 A | 7/2000 | Gildert |

FOREIGN PATENT DOCUMENTS

| | | |
|---|---|---|
| EP | 0 755 995 A1 | 1/1997 |
| EP | 0 832 958 A1 | 4/1998 |
| WO | WO 94/22980 | 10/1994 |
| WO | WO 97/03150 | 1/1997 |
| WO | WO 98/12158 | 3/1998 |

Primary Examiner—Walter D. Griffin
(74) Attorney, Agent, or Firm—Millen White Zelano & Branigan, P.C.

(57) ABSTRACT

The invention relates to a process for the production of gasoline with a low sulfur content that comprises at least the following stages:

a1) at least a selective hydrogenation of diolefins, a2) optionally at least one stage that is aimed at increasing the molecular weight of the light sulfur-containing products that are present in the gasoline, b) at least one separation of the gasoline that is obtained in stage a1 or a2 into two fractions: light gasoline and heavy gasoline, c) at least one treatment with heavy gasoline that is separated in stage b on a catalyst that makes it possible to decompose or to hydrogenate at least partially the unsaturated sulfur-containing compounds, d) at least one treatment of the heavy gasoline that is obtained in stage c, without eliminating the H2S that is formed during this stage, on a catalyst that makes it possible to decompose the sulfur-containing compounds and more preferably the linear and/or cyclic saturated compounds.

19 Claims, No Drawings

PROCESS FOR THE PRODUCTION OF GASOLINES WITH LOW SULFUR CONTENTS

This application is a continuation of application Ser. No. 09/628,177, filed on Jul. 28, 2000, now abandoned, which claims the benefit of provisional application No. 60/154,036, filed on Sep. 16, 1999.

This invention relates to a process for the production of gasolines with low sulfur content that makes it possible to upgrade the entire gasoline fraction that contains sulfur, to reduce the total sulfur content of said gasoline fraction to very low levels, without appreciable reduction of the gasoline output and by minimizing the reduction of the octane number that is caused by the hydrogenation of the olefins.

PRIOR ART

The production of reformulated gasolines that meet new environmental standards requires in particular that their olefin concentration be reduced slightly but that their concentration in aromatic compounds (mainly benzene) and sulfur be reduced to a significant extent. The catalytic cracking gasolines, which may represent 30 to 50% of the gasoline pool, have high olefin and sulfur contents. The sulfur that is present in the reformulated gasolines can be nearly 90%, attributed to the catalytic cracking gasoline (FCC, "Fluid Catalytic Cracking," or fluidized bed catalytic cracking). The desulfurization (hydrodesulfurization) of gasolines and mainly FCC gasolines is therefore of obvious importance to achieve the specifications.

Hydrotreatment (hydrodesulfurization) of the feedstock that is sent to catalytic cracking results in gasolines that typically contain 100 ppm of sulfur. The hydrotreatment units of catalytic cracking feedstocks operate, however, under severe temperature and pressure conditions, which assumes an important investment effort. In addition, the entire feedstock should be desulfurized, which involves the treatment of very large volumes of feedstock.

The hydrotreatment (or hydrodesulfurization) of the catalytic cracking gasolines, when it is carried out under standard conditions that are known to one skilled in the art, makes it possible to reduce the sulfur content of the fraction. This process, however, has the major drawback of causing a very significant drop in the octane number of the fraction caused by the saturation of all of the olefins during hydrotreatment.

The separation of light gasoline and heavy gasoline before hydrotreatment has already been claimed in U.S. Pat. No. 4,397,739. This type of separation makes it possible to separate a light fraction that is olefin-rich and that has a low sulfur content, which will no longer be compatible with the future specifications and a rich heavy fraction that is low in olefin and that contains a large amount of sulfur of the starting gasoline. This patent claims a process for hydrodesulfurization of the gasolines that comprises a fractionation of the gasoline into a light fraction and a heavy fraction and a specific hydrodesulfurization of the heavy fraction, but no solution is proposed to eliminate the sulfur that is present in the light gasoline.

In contrast, U.S. Pat. No. 4,131,537 teaches that it is advantageous to fractionate the gasoline into several fractions, preferably three, as a function of their boiling point, and to desulfurize them under conditions that may be different and in the presence of a catalyst that comprises at least one metal of group VIB and/or of group VIII. This patent indicates that the greatest benefit is obtained when the gasoline is fractionated into three fractions and when the fraction that has intermediate boiling points is treated under mild conditions.

Patent Application EP-A-0 755 995 describes a process for desulfurization of FCC gasolines that comprises at least two stages. The first is a catalytic hydrodesulfurization at a temperature of between 200 and 350° C. with a desulfurization rate of between 60 and 90%, and it is carried out in the presence of a feedstock that contains less than 0.1% by volume of hydrogen sulfide (H2S). The second, thus optionally the subsequent ones, are also catalytic hydrodesulfurization stages that are operated between 200 and 300° C. and in the presence of a feedstock that comprises less than 0.05% by volume of H2S. The desulfurization rate is between 60 and 90% in this stage. In this process, the H2S concentration should be kept at a very low level. In the event of excess hydrogen being recycled, it is therefore in general necessary to eliminate the H2S, for example with an absorption stage with amines, after the second stage and the subsequent ones, so that the recycling gas contains less than 0.1% by volume of H2S. it is also preferred to eliminate the H2S between the first and the second stage to observe the maximum H2S content at the input of the second stage (0.05% by volume). For gasolines that are loaded on sulfur, such an elimination is therefore necessary, taking into consideration the desulfurization rate that is greater than 60% in the first stage.

Patent Application EP-A-0 725 126 describes a process for hydrodesulfurization of a cracking gasoline in which the gasoline is separated into a number of fractions that comprise at least a first fraction that is rich in compounds that are easy to desulfurize and a second fraction that is rich in compounds that are difficult to desulfurize. Before carrying out this separation, it is necessary to determine in advance the distribution of the sulfur-containing products with analyses. These analyses are necessary for selecting the equipment and the separation conditions.

In this application, it is thus indicated that olefin content and the octane number of a light cracking gasoline fraction drop significantly when it is desulfurized without being fractionated. In contrast, the fractionation of said light fraction into 7 to 20 fractions, followed by analyses of the sulfur and olefin contents of these fractions, makes it possible to determine the fraction or fractions that are richest in sulfur-containing compounds, which are then desulfurized simultaneously or separately and mixed with other fractions that may or may not be desulfurized. Such a procedure is complex and should be reproduced at each change in composition of the gasoline that is to be treated.

French Patent Application No. 98/14480 teaches the advantage of fractionating the gasoline into a light fraction and a heavy fraction and then in carrying out specific hydrotreatment of the light gasoline on a nickel-based catalyst, and a hydrotreatment of the heavy gasoline on a catalyst that comprises at least one metal of group VIII and/or at least one metal of group VIb.

Processes for hydrotreatment of gasolines that consist in fractionating the gasoline, then in introducing the fractions at different levels of a hydrodesulfurization reactor and in converting the desulfurized fractions on a ZSM-5 zeolite to compensate the octane loss that is recorded with an isomerization, have also been proposed, for example, in U.S. Pat. No. 5,290,427.

In these processes, the gasolines that are to be treated in general have a starting point that is greater than 70° C., and there again it is necessary to treat the light gasoline separately (fraction that corresponds to the compounds with boiling points between C5 (hydrocarbon with 5 carbon atoms) and 70° C.), for example by sweetening.

U.S. Pat. No. 5,318,690 proposes a process with a gasoline fractionation and a sweetening of the light fraction, while the heavy fraction is desulfurized, then converted to ZSM-5 and desulfurized again under mild conditions. This technique is based on a separation of the crude gasoline to obtain a light fraction that is virtually lacking in sulfur-containing compounds other than mercaptans. This makes it possible to treat said fraction only with a sweetening that removes the mercaptans.

The heavy fraction thus contains a relatively large amount of olefins that are partly saturated during the hydrotreatment. To compensate for the drop of the octane number that is associated with the hydrogenation of the olefins, the patent recommends cracking on zeolite ZSM-5 which produces olefins, but to the detriment of the output. In addition, these olefins can recombine with the $H_2S$ that is present in the medium for reforming mercaptans. It is then necessary to carry out a sweetening or an additional hydrodesulfurization.

SUMMARY OF THE INVENTION

This invention relates to a process for the production of gasolines with low sulfur contents, which makes it possible to upgrade the entire gasoline fraction that contains sulfur, preferably a catalytic cracking gasoline fraction, and to reduce the sulfur content in said gasoline fraction to very low levels, without appreciable reduction of the gasoline output while minimizing the reduction of the octane number that is caused by the hydrogenation of the olefins.

The process according to the invention is a process for the production of gasoline with a low sulfur content from a gasoline fraction that contains sulfur (starting gasoline). It comprises at least the following stages:

a1) at least a selective hydrogenation of diolefins that are present in the starting gasoline, a2) optionally at least one stage that is aimed at increasing the molecular weight of the light sulfur-containing products that are present in the gasoline. This stage can optionally be achieved simultaneously to stage a1 over all or part of the starting gasoline, in the same reactor or a different reactor. It can also be carried out separately over all or part of the gasoline that is hydrogenated at stage a1, b) at least one separation of the gasoline that is obtained in stage a1 or a2 into two fractions (or cuts), one that is virtually lacking in sulfur and that contains the lightest olefins of the starting gasoline (light gasoline or light fraction), and the other in which the majority of the sulfur-containing compounds that are initially present in the starting gasoline are concentrated (heavy gasoline or fraction), c) at least one treatment of heavy gasoline that is separated in stage b on a catalyst that makes it possible to decompose or to hydrogenate at least partially the unsaturated sulfur-containing compounds, in particular the cyclic and even aromatic sulfur-containing compounds, such as, for example, the thiophenic compounds, by being applied under conditions where the hydrogenation of the olefins on this catalyst is limited, d) at least one treatment of the heavy gasoline that is obtained in stage c, without eliminating the H2S that is formed during this stage, on a catalyst that makes it possible to decompose the sulfur-containing compounds and more preferably the linear and/or cyclic saturated sulfur-containing compounds, with a limited hydrogenation of olefins.

These catalytic treatments can be carried out either in a single reactor that contains the two catalysts or in at least two different reactors. When the treatment is carried out with two reactors, the two latter reactors are placed in series, whereby the second reactor preferably integrally treats the effluent at the output of the first reactor, preferably without separation of the liquid and gas between the first and the second reactor. It is also possible to use several reactors in parallel or in series for one and/or the other of stages c and/or d.

Furthermore, it is not necessary to eliminate the H2S that is formed during stage c before sending the effluent of this stage (stage c) to the input of the hydrodesulfurization reactor or reactors of stage d.

One of the advantages of the process according to the invention therefore lies in the fact that it is not necessary to adjust the H2S content between stage c and stage d.

Furthermore, a stage e is preferably carried out after stage d, and this stage consists in mixing the light gasoline that is separated in stage b and the heavy gasoline that is obtained from stage d.

Preferably all of the desulfurized heavy gasoline that is obtained from stage d is mixed with the light gasoline that comes from stage b, without separating the liquid and the gas that are contained in the heavy gasoline after desulfurization, optionally a simple stripping by an inert gas can be carried out to eliminate the H2S from the totally desulfurized heavy gasoline.

In some specific cases, the development of the light gasoline and the desulfurized heavy gasoline is carried out separately. It is then unnecessary to carry out stage e.

The feedstock of the process according to the invention is a gasoline fraction that contains sulfur, preferably a gasoline fraction that is obtained from a catalytic cracking unit, whose range of boiling points typically extends from approximately the boiling points of hydrocarbons with 5 carbon atoms (C5) up to approximately 250° C. The end point of the gasoline fraction depends on the refinery from which it is obtained and market constraints, but it generally remains within the limits that are indicated above.

DETAILED DESCRIPTION OF THE INVENTION

This invention describes a process that makes it possible to obtain a gasoline that is preferably obtained from a catalytic cracking unit and that has a limited sulfur content in which the gasoline first undergoes selective hydrogenation treatment of diolefins, then optionally a stage that aims making heavy the lightest sulfur-containing compounds of the gasoline, which after fractionation should be in the light gasoline, then treatment of the heavy gasoline thanks to the combination of at least two suitable catalysts, at least a first catalyst that promotes the transformation of unsaturated sulfur compounds that are present in the gasoline, such as, for example, the thiophenic compounds, and at least a second catalyst that promotes the selective transformation of linear or cyclic saturated sulfur compounds that are already present in the heavy fraction or are produced during the first stage.

This scheme makes it possible to obtain in fine a desulfurized gasoline that has no significant reduction in the olefin content or the octane number even for high desulfurization rates; and this is so without it being necessary to treat the light gasoline or to have recourse to processes that make it possible to recover the octane number of the gasoline. Thanks to this process, significant hydrodesulfurization rates are achieved under reasonable operating conditions that are specified below.

The sulfur-containing radicals that are contained in the feedstocks that are treated by the process of the invention can be mercaptans or heterocyclic compounds, such as, for example, thiophenes or alkyl-thiophenes, or heavier compounds, such as, for example, benzothiophene or dibenzothiophene. When the gasoline is fractionated in two fractions, a light olefin-rich fraction and a heavy fraction that is low in olefins, the light sulfur-containing compounds (for example: ethyl mercaptan, propylmercaptan and optionally thiophene) can be partly and even completely present in the light gasoline. It is then necessary to apply an additional treatment to this light fraction to eliminate the sulfur that it contains. In a conventional manner, this treatment is an extractive sweetening which makes it possible to eliminate from the gasoline the light sulfur compounds that are present in the form of mercaptan. In addition to the fact that this treatment inevitably increases the cost of the operation, it is operational only if the sulfur is in the form of mercaptan. Thus, the fractionation point of the gasoline will be limited so as not to cause the presence of thiophene in the light gasoline. Whereby the latter forms azeotropes with a certain number of hydrocarbons, it will be possible to separate in the gasoline only the C5 olefins and a small portion of the C6 olefins for fear of entraining too large a thiophene fraction into this fraction.

To make it possible to recover a larger fraction of the olefins that are present in the light gasoline while limiting the sulfur content of this fraction without additional treatment, it is preferably proposed to treat the feedstock under conditions and on catalysts that make it possible to transform the light sulfur-containing compounds into sulfur-containing compounds that have a higher boiling point and that are found again in the heavy gasoline after the separation. The heavy gasoline is desulfurized under defined conditions and with a catalyst scheme that makes it possible to reach high desulfurization levels while limiting the hydrogenation rate of olefins and therefore the loss of octane.

The sulfur content of the gasoline fractions that are produced by catalytic cracking (FCC) depends on the sulfur content of the feedstock that is treated in the FCC, as well as the end point of the fraction. Generally, the sulfur contents of the entire gasoline fraction, in particular the ones that are obtained from the FCC, are greater than 100 ppm by weight and most often greater than 500 ppm by weight. For gasolines that have end points that are greater than 200° C., the sulfur contents are often greater than 1,000 ppm by weight, and they can even in some cases reach values on the order of 4,000 to 5,000 ppm by weight.

The process according to the invention applies particularly when high desulfurization rates of the gasoline are required, i.e., when the desulfurized gasoline should contain at most 10% of the sulfur of the starting gasoline and optionally at most 5% and even at most 2% of the sulfur of the starting gasoline that corresponds to desulfurization rates that are greater than 90% and even greater than 95% or 98%.

The process according to the invention comprises at least the following stages:

a1) at least one stage that is carried out by passage of the feedstock, preferably consisting of the entire gasoline fraction, on a catalyst that makes it possible to hydrogenate selectively the diolefins of the gasoline without hydrogenating the olefins, a2) optionally at least one optional stage that consists in passing all or part of the starting gasoline or the gasoline that is hydrogenated in stage a1, preferably all of the starting gasoline or the gasoline that is hydrogenated in stage a1, over a catalyst that makes it possible to transform at least partly the light sulfur-containing compounds (for example: ethylmercaptan, propyl mercaptan, thiophene) or all or part of the olefins into heavier sulfur-containing compounds. This stage is preferably carried out simultaneously with stage a1 by passing, for example, the starting gasoline over a catalyst that is able both to hydrogenate the diolefins and to transform the light sulfur-containing compounds or the olefins into heavier sulfur-containing compounds, or over a separate catalyst but that makes it possible to carry out this transformation in the same reactor as stage a1. It is optionally possible to observe in certain types of feedstocks an increase of mercaptans at the end of a1) or a2), and this increase in mercaptans is probably due to a hydrogenolysis of the disulfides of high molecular weight, b) at least one stage that aims at separating the starting gasoline into a light gasoline and a heavy gasoline. The fraction point of the light gasoline and the heavy gasoline is determined to limit the sulfur content of the light gasoline and to allow its use in the gasoline pool preferably without additional post-treatment, c) at least one stage that comprises the treatment of at least a portion of the heavy gasoline of the gasoline on a catalyst that makes possible the transformation of at least a portion of the unsaturated sulfur-containing compounds that are present in said feedstock, such as, for example, the thiophenic compounds, into saturated compounds, such as, for example, thiophanes (or thiacyclopentanes) or the mercaptans, according to a succession of reactions that are described below:

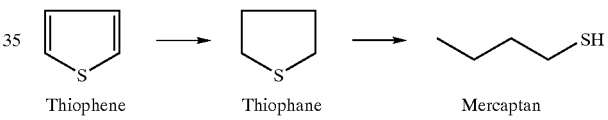

Thiophene        Thiophane        Mercaptan

The reaction of total decomposition with release of $H_2S$ is also possible. This hydrogenation reaction can be carried out on any catalyst that promotes these reactions, such as, for example, a catalyst that comprises at least one metal of group VIII and/or at least one metal of group VIb, and preferably at least partly in sulfide form. When such a catalyst is used, the operating conditions are adjusted to be able to hydrogenate at least partly the saturated compounds, such as the thiophenic compounds, while limiting the hydrogenation of the olefins, d) at least one stage in which the saturated sulfur-containing compounds that are present in the starting gasoline or that are obtained in stage c are converted into H2S according to the reaction examples:

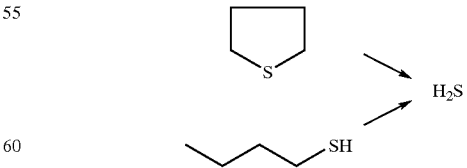

This treatment can be carried out on any catalyst that makes possible the conversion of saturated sulfur compounds (mainly the thiophane-type or mercaptan-type compounds). It can be carried out, for example, on a nickel-, molybdenum- or cobalt-based catalyst.

The thus desulfurized gasoline is then optionally stripped (i.e., a gaseous current that preferably contains one or more inert gases is passed through this gasoline) to eliminate the $H_2S$ that is produced during the hydrodesulfurization. The light gasoline that is separated in stage b and the heavy gasoline that is desulfurized in stage d can then optionally either be mixed (stage e) and sent into the gasoline pool of the refinery, or used separately without being mixed.

One of the advantages of the process according to the invention lies in the fact that it is not necessary to adjust the H2S content between stage c and stage d. The effluent that is obtained from stage c can be sent directly to stage d without adjustment of the H2S content and preferably without any separation of the liquid and gas or intermediate elimination of compounds that are contained in this effluent. High hydrodesulfurization rates are actually reached in the presence of H2S in the feedstock of stage d at contents that are generally greater than 0.07% by volume, and even greater than 0.1% by volume.

The stages of the process according to the invention are described in more detail below.

Hydrogenation of Diolefins (Stage a1):

The hydrogenation of the dienes is a stage that makes it possible to eliminate, before hydrodesulfurization, almost all of the dienes that are present in the gasoline fraction that contains the sulfur that is to be treated. It preferably takes place in the first stage (stage a1) of the process according to the invention, generally in the presence of a catalyst that comprises at least one metal of group VIII, preferably selected from the group that is formed by platinum, palladium and nickel, and a substrate. For example, a nickel-based or palladium-based catalyst that is deposited on an inert substrate, such as, for example, alumina, silica or a substrate that contains at least 50% of alumina, will be used.

The pressure that is used is adequate for maintaining more than 60%, preferably 80%, and more preferably 95% by weight of the gasoline that is to be treated in liquid phase in the reactor; it is most generally between about 0.4 and about 5 MPa and preferably greater than 1 MPa, more preferably between 1 and 4 MPa. The hourly volumetric flow rate of the liquid that is to be treated is between about 1 and about 20 $h^{-1}$ (volume of feedstock per volume of catalyst and per hour), preferably between 4 and 10 $h^{-1}$, very preferably between 5 and 8 $h^{-1}$. The temperature is most generally between about 50 and about 250° C., and preferably between 80 and 200° C., and more preferably between 100 and 190° C., to ensure a sufficient conversion of diolefins. Very preferably, it is limited to 180° C. The hydrogen to feedstock ratio that is expressed in liters is generally between 5 and 50 liters per liter, preferably between 8 and 30 liters per liter.

The selection of operating conditions is particularly important. The operation most generally will be performed under pressure in the presence of an amount of hydrogen that is excess relative to the stoichiometric value that is necessary for hydrogenating the diolefins. The hydrogen and the feedstock that is to be treated are injected in upward or downward flows in a reactor that preferably comprises a fixed catalyst bed.

Another metal can be combined with the main metal to form a bimetallic catalyst, such as, for example, molybdenum or tungsten. The use of such catalytic formulas has been claimed in, for example, Patent FR 2 764 299.

The catalytic cracking gasoline can contain up to several % by weight of diolefins. After hydrogenation, the diolefin content is generally reduced to less than 3000 ppm, and even less than 2500 ppm and more preferably less than 1500 ppm. In some cases, less than 500 ppm can be obtained. The diene content after selective hydrogenation can even, if necessary, be reduced to less than 250 ppm.

According to a particular embodiment of the process according to the invention, the hydrogenation stage of the dienes takes place in a catalytic hydrogenation reactor that comprises a catalytic reaction zone that is traversed by the entire feedstock and the quantity of hydrogen that is necessary to carry out the desired reactions.

Transformation of Light Sulfur Compounds into Heavier Compounds (Stage a2):

This optional stage consists in transforming the light sulfur compounds that would be found in the light gasoline at the end of separation stage b) into heavier sulfur-containing compounds that are entrained in the heavy gasoline. It is carried out preferably on a catalyst that comprises at least one element of group VIII (groups 8, 9 and 10 of the new periodic table) or that comprises a resin.

This optional stage optionally can be carried out at the same time as stage a1. For example, it can be particularly advantageous to operate, during the hydrogenation of the diolefins, under conditions such that at least a portion of the compounds in mercaptan form are transformed. A certain reduction of the mercaptan content thus is obtained. To do this, it is possible to use the procedure for hydrogenating dienes that is described in Patent Application EP-A-0 832 958, which advantageously uses a palladium-based catalyst, or the one that is described in Patent FR 2 720 754.

Another possibility is to use a nickel-based catalyst that is identical to or different from the catalyst of stage a1, such as, for example, the catalyst that is recommended in the process of U.S. Pat. No. 3,691,066, which makes it possible to transform the mercaptans (butylmercaptan) into heavier sulfur-containing compounds (methyl thiophene).

Another possibility for carrying out this stage consists in hydrogenating at least partly the thiophene into thiophane whose boiling point is greater than that of thiophene (boiling point 121° C.). This stage can be carried out on a catalyst with a nickel, platinum or palladium base. In this case, the temperatures are generally between 100 and 300° C., and preferably between 150 and 250° C. The H2/feedstock ratio is adjusted between 5 and 20 liters per liter, preferably between 5 and 15 liters per liter, to make possible the desired hydrogenation of the thiophenic compounds while reducing the hydrogenation of the olefins that are present in the feedstock. The volumetric flow rate is generally between 1 and 10 $h^{-1}$, preferably between 2 and 4 $h^{-1}$, and the pressure is between 0.5 and 5 MPa, preferably between 1 and 3 MPa.

Another possibility for carrying out this stage consists in passing the gasoline over a catalyst that has an acid function that makes it possible to carry out the addition of the sulfur-containing compounds in the form of mercaptans on the olefins and to carry out the alkylation reaction of the thiophene by these same olefins. This stage can be carried out, for example, by passing the gasoline that is to be treated over a resin such as Amberlyst 15. The operating conditions will be adjusted to carry out the desired transformation while limiting the parasite reactions of oligomerization of the olefins. The operation is generally carried out in the presence of a liquid phase at a temperature of between 10 and 150° C. and preferably between 10 and 70° C. The operating pressure is between 0.1 and 2 MPa and preferably between 0.5 and 1 MPa. The volumetric flow rate is generally between 0.5 and 10 $h^{-1}$ and preferably between 0.5 and 5 $h^{-1}$. In this stage, the conversion rate of the mercaptans is generally greater than 50%, and the transformation rate of the thiophene is generally greater than 20%.

To reduce the oligomerizing activity of the acid catalyst that is optionally used, the gasoline can be supplemented with a known compound for inhibiting the oligomerizing activity of the acid catalysts, such as the alcohols, ethers or water.

Separation of Gasoline into Two Fractions (Stage b):

In this stage, the gasoline is fractionated in two fractions:
- a light fraction that contains a limited residual sulfur content that makes it possible to use this fraction, preferably without other treatment that aims at reducing its sulfur content;
- a heavy fraction in which the bulk of the sulfur that is initially present in the feedstock is concentrated.

This separation is preferably carried out with a standard distillation column that is also called a splitter. This fractionation column should make it possible to separate a light fraction of the gasoline that contains a small fraction of sulfur and a heavy fraction that contains the bulk of the sulfur that was initially present in the starting gasoline.

This column generally operates at a pressure of between 0.1 and 2 MPa and preferably between 0.2 and 1 MPa. The number of theoretical plates of this separation column is generally between 10 and 100 and preferably between 20 and 60. The reflux rate, which is expressed as being the ratio of liquid traffic in the column that is divided by the flow of distillate, expressed in kg/h, is generally less in the unit and preferably less than 0.8.

The light gasoline that is obtained at the end of the separation generally contains at least all of the C5 olefins, preferably the C5 compounds and at least 20% of the C6 olefins. Generally, this light fraction has a low sulfur content, i.e., it is generally unnecessary to treat the light fraction before using it as a fuel.

In some extreme cases, however, sweetening of the light gasoline can be envisioned.

Hydrogenation of Unsaturated Sulfur Compounds (Stage c):

This stage, which applies to the heavy gasoline that is obtained at the end of separation stage b, consists in transforming at least a portion of the unsaturated sulfur compounds, such as the thiophenic compounds, into saturated compounds, for example, thiophanes (or thiacyclopentanes) or mercaptans, or else in hydrogenolyzing at least partially these unsaturated sulfur-containing compounds for forming the $H_2S$.

This stage can be carried out, for example, by passage of the heavy gasoline, in the presence of hydrogen, onto a catalyst that comprises at least one element of group VIII and/or at least one element of group VIb at least partly in sulfide form at a temperature of between about 210° C. and about 320° C., preferably between 220° C. and 290° C., under a pressure that is generally between about 1 and about 4 MPa, preferably between 1.5 and 3 MPa. The volumetric flow rate of the liquid is between about 1 and about 20 $h^{-1}$ (expressed by volume of liquid per volume of catalyst and per hour), preferably between 1 and 10 $h^{-1}$, very preferably between 3 and 8 $h^{-1}$. The $H_2$/HC ratio is between 100 to 600 liters per liter and preferably between 300 and 600 liters per liter.

To carry out, at least in part, the hydrogenation of unsaturated sulfur-containing compounds of the gasoline according to the process of the invention, in general at least one catalyst is used that comprises at least one element of group VIII (metals of groups 8, 9 and 10 of the new classification, i.e., iron, ruthenium, osmium, cobalt, rhodium, iridium, nickel, palladium or platinum) and/or at least one element of group VIb (metals of group 6 of the new classification, i.e., chromium, molybdenum or tungsten) on an appropriate substrate.

The metal content of group VIII that is expressed in oxide is generally between 0.5 and 15% by weight, preferably between 1 and 10% by weight. The metal content of group VIb is generally between 1.5 and 60% by weight, preferably between 3 and 50% by weight.

The element of group VIII, when it is present, is preferably cobalt, and the element of group VIb, when it is present, is generally molybdenum or tungsten. Combinations such as cobalt-molybdenum are preferred. The substrate of the catalyst is usually a porous solid, such as, for example, an alumina, a silica-alumina or other porous solids, such as, for example, magnesia, silica or titanium oxide, alone or mixed with alumina or silica-alumina. To reduce the hydrogenation of the olefins that are present in the heavy gasoline, it is advantageous to use, preferably, a catalyst in which the molybdenum density, expressed in % by weight of $MoO3$ per unit of surface area is greater than 0.07 and preferably greater than 0.10. The catalyst according to the invention preferably has a specific surface area that is less than 190 m2/g, more preferably less than 180 m2/g, and very preferably less than 150 m2/g.

After introduction of the element or elements and optionally after the catalyst is shaped (when this stage is carried out on a mixture that already contains the basic elements), the catalyst is in a first activated stage. This activation may correspond either to an oxidation, then to a reduction, or to a direct reduction or to a calcination alone. The calcination stage is generally carried out at temperatures of from about 100 to about 600° C. and preferably between 200 and 450° C. under an air flow. The reduction stage is carried out under conditions that make it possible to convert at least a portion of the oxidized forms of base metal into metal. It generally consists in treating the catalyst under a hydrogen flow at a temperature that is preferably at least equal to 300° C. The reduction can also be carried out partly with chemical reducing agents.

The catalyst is preferably used at least in part in its sulfurized form. The introduction of the sulfur can take effect before or after every activation stage, i.e., calcination or reduction stage. Preferably, no oxidation stage is carried out when the sulfur or a sulfur-containing compound has been introduced onto the catalyst. The sulfur or a sulfur-containing compound can be introduced ex situ, i.e., apart from the reactor where the process according to the invention is carried out, or in situ, i.e., in the reactor that is used for the process according to the invention. In the latter case, the catalyst is preferably reduced under the conditions that are described above, then sulfurized by passage of a feedstock that contains at least one sulfur-containing compound, which, once decomposed, results in the attachment of sulfur to the catalyst. This feedstock can be gaseous or liquid, for example hydrogen that contains H2S, or a liquid that contains at least one sulfur-containing compound.

In a preferred way, the sulfur-containing compound is added to the catalyst ex situ. For example, after the calcination stage, a sulfur-containing compound can be introduced into the catalyst optionally in the presence of another compound. The catalyst is then dried, and transferred into the reactor that is used to implement the process according to the invention. In this reactor, the catalyst is then treated under hydrogen to transform at least a portion of the main metal into sulfide. A procedure that is especially suitable to the invention is the one that is described in Patents FR-B-2 708 596 and FR-B-2 708 597.

In the process according to the invention, the conversion of the unsaturated sulfur-containing compounds is greater than 15% and preferably greater than 50%. In the same step, the hydrogenation rate of the olefins is preferably less than 50%, more preferably less than 40%, and very preferably less than 35% during this stage, based on the olefins in the heavy gasoline entering stage(s).

The effluent that is obtained from this first hydrogenation stage is then sent preferably without any separation of the liquid and gas to stage d), which makes it possible to decompose the sulfur-containing compounds that are saturated with H2S.

Decomposition of Saturated Sulfur Compounds (Stage d):

In this stage, the saturated sulfur compounds are transformed in the presence of hydrogen on a suitable catalyst. The decomposition of the unsaturated compounds that are not hydrogenated during stage c can also have taken place simultaneously. This transformation is carried out without significant hydrogenation of olefins, i.e., during this stage, the hydrogenation of the olefins is generally limited to 20% by volume relative to the olefin content of the starting gasoline, and preferably limited to 10% by volume relative to the olefin content of the starting gasoline.

The catalysts that can be suitable for this stage of the process according to the invention, without this list being limiting, are catalysts that generally comprise at least one basic element that is selected from among the elements of group VIII, preferably selected from the group that is formed by nickel, cobalt, iron, molybdenum, and tungsten. These metals can be used alone or in combination; they are preferably supported and used in their sulfurized form. The catalyst of stage d preferably has a nature and/or composition that is different from the one that is used in stage c.

The base metal content of the catalyst according to the invention is generally between about 1 and about 60% by weight, preferably between 5 and 20% by weight, and very preferably between 5 and 9% by weight. In a preferred way, the catalyst is generally shaped, preferably in the form of balls, pellets, extrudates, for example three-lobes. The metal can be incorporated in the catalyst by deposition on the preformed substrate; it can also be mixed with the substrate before the shaping stage. The metal is generally introduced in the form of a precursor salt that is generally water-soluble, such as, for example, nitrates and heptamolybdates. This method of introduction is not specific to the invention. Any other method of introduction that is known to one skilled in the art can be suitable.

The substrates of the catalysts that are used in this stage of the process according to the invention are generally porous solids that are selected from among the refractory oxides, such as, for example, the aluminas, silicas and silica-aluminas, magnesia, as well as titanium oxide and zinc oxide, whereby these latter oxides can be used alone or in a mixture with the alumina or the silica-alumina. The substrates preferably are transition aluminas or silicas whose specific surface area is included in 25 and 350 m$^2$/g. The natural compounds, such as, for example, diatomaceous earth or kaolin, can also be suitable as substrates of the catalysts that are used in this stage of the process.

After the base metal is introduced and after optional shaping of the catalyst (when this stage is carried out starting from a mixture that already contains the base metal), the catalyst is activated in a first stage. This activation can correspond either to an oxidation and then a reduction, or to a direct reduction or else only to a calcination. The calcination stage is generally carried out at temperatures from about 100 to about 600° C. and preferably between 200 and 450° C., under a flow of air. The reduction stage is carried out under conditions that make it possible to convert at least a portion of the oxidized forms of base metal into metal. Generally, it consists in treating the catalyst under a hydrogen flow at a temperature that is at least equal to 300° C. The reduction can also be carried out in part with chemical reducing agents.

The catalyst is preferably used at least in part in its sulfurized form. This offers the advantage of limiting as much as possible the hydrogenation risks of the unsaturated compounds, such as olefins or aromatic compounds, during the start-up phase. The introduction of sulfur can take place between different activation stages. Preferably, no oxidation stage is carried out when the sulfur or a sulfur-containing compound is introduced onto the catalyst. The sulfur or a sulfur-containing compound can be introduced ex situ, i.e., apart from the reactor where the process according to the invention is carried out, or in situ, i.e., in the reactor that is used for the process according to the invention. In the latter case, the catalyst is preferably reduced under the conditions that are described above, then sulfurized by passage of a feedstock that contains at least one sulfur-containing compound, which, once decomposed, results in the attachment of sulfur onto the catalyst. This feedstock can be gaseous or liquid, for example with hydrogen that contains $H_2S$, or a liquid that contains at least one sulfur-containing compound.

In a preferred way, the sulfur-containing compound is added to the catalyst ex situ. For example, after the calcination stage, a sulfur-containing compound can be introduced onto the catalyst optionally in the presence of another compound. The catalyst is then dried, and transferred into the reactor that is used to implement the process of the invention. In this reactor, the catalyst is then treated under hydrogen to transform at least a portion of the main metal into sulfide. A procedure that is especially suitable for the invention is the one that is described in Patents FR-B-2 708 596 and FR-B-2 708 597.

After sulfurization, the sulfur content of the catalyst is generally between 0.5 and 25% by weight, preferably between 4 and 20% by weight and very preferably between 4 and 10% by weight.

The purpose of the hydrodesulfurization that is carried out during this stage is to convert into $H_2S$ the saturated sulfur-containing compounds of the gasoline that have already undergone at least one previous hydrogenation of the unsaturated sulfur compounds during stage c. It makes it possible to obtain an effluent that meets the desired specifications in terms of sulfur-containing compound content. The gasoline that is thus obtained has only a small octane loss.

The treatment that aims at decomposing the saturated sulfur-containing compounds that are obtained from stage c of the process is carried out in the presence of hydrogen, with the catalyst that comprises at least one base metal that is selected from the group that is formed by nickel, cobalt, iron, molybdenum, tungsten, at a temperature of between about 280° C. and about 400° C., preferably between about 290° C. and about 380° C., more preferably between 310° C. and 360° C., and very preferably between 320° C. and 350° C., under a pressure that is generally selected between about 0.5 and about 5 MPa, preferably between 1 and 3 MPa, more preferably between 1.5 and 3 MPa. The volumetric flow rate of the liquid is between about 0.5 and about 10 h$^{-1}$ (expressed in liquid volume per volume of catalyst and per hour), preferably between 1 and 8 h$^{-1}$. The $H_2$/HC ratio is adjusted based on the desired hydrodesulfurization rates in the range of between about 100 and about 600 liters per liter, preferably between 100 and 300 liters per liter. All or part of this hydrogen can optionally come from stage c (unconverted hydrogen) or form a recycling of the hydrogen that is not consumed in stages a1, a2 or d.

It has been found that the use of this second catalyst in this stage, under special operating conditions, makes it possible to decompose the saturated compounds, which are contained in the effluent that is obtained from stage c, into H2S. This use makes it possible to achieve a high comprehensive hydrodesulfurization rate at the end of all of the stages of the process according to the invention, while minimizing the octane loss that results from the saturation of the olefins, because the conversion of the olefins during stage d is generally limited to at most 20% by volume of the olefins, preferably at most 10% by volume. In addition, it is generally unnecessary to treat the light gasoline, which also limits the olefin losses.

In conclusion, the process according to the invention is a process for the production of gasoline with a low sulfur content that comprises at least the following stages:

a1) at least a selective hydrogenation of diolefins that are present in the starting gasoline, a2) optionally at least one stage that is aimed at increasing the molecular weight of the light sulfur-containing products that are present in the gasoline. This stage can optionally be achieved simultaneously to stage a1 over all or part of the starting gasoline, in the same reactor or a different reactor. It can also be carried out separately over all or part of the gasoline that is hydrogenated at stage a1, b) at least one separation of the gasoline that is obtained in stage a1 or a2 into two fractions, one that is virtually lacking in sulfur and that contains the lightest olefins of the starting gasoline (light gasoline), and the other in which the majority of the sulfur-containing compounds that are initially present in the starting gasoline is concentrated (heavy gasoline), c) at least one treatment of the heavy gasoline that is separated in stage b on a catalyst that makes it possible to decompose or to hydrogenate at least partially the unsaturated sulfur-containing compounds, under conditions where the hydrogenation of the olefins on this catalyst is limited, d) at least one treatment of the heavy gasoline that is obtained in stage c, without eliminating the H2S that is formed during this stage, on a catalyst that makes it possible to decompose the unsaturated sulfur-containing compounds that are not hydrogenated in C and more preferably the linear and/or cyclic saturated sulfur-containing compounds, with a limited hydrogenation of olefins.

The process according to the invention can also comprise at least one stage a2 that is aimed at increasing the molecular weight of the light sulfur-containing products that are present in the gasoline.

Optionally, and preferably, stages a1 and a2 of the process according to the invention are carried out simultaneously in the same reactor and on the same catalyst.

It has been found that the use of this second catalyst in this stage, under special operating conditions, makes it possible to decompose the saturated compounds, contained in the effluent that is obtained from the preceding stage, into H2S. This use makes it possible to reach a high overall level of hydrodesulfurization at the end of all of the stages of the process according to the invention, while reducing the octane loss that results from the saturation of the olefins, because the conversion of olefins during stage d) is generally limited to at most 20% by volume of the olefins, preferably at most 10% by volume.

EXAMPLE 1

A gasoline that is obtained from a catalytic cracking unit whose characteristics are indicated in Table 1 (starting gasoline) is separated into two fractions: a light fraction whose fraction point corresponds to a temperature of 63° C. and a heavy fraction. The light gasoline represents 25% by weight of the starting gasoline and brings together 88% of the olefinic compounds that have 5 carbon atoms that were present in the starting gasoline and 23% of the olefins that have 6 carbon atoms. The characteristics of the separation column are as follows: 30 theoretical plates, pressure in the reflux flask=0.5 MPa, feed temperature 100° C.

The characteristics of the light gasoline and the heavy gasoline are presented in Table 1.

TABLE 1

|  | Starting Gasoline | Light Gasoline PI-63 | Heavy Gasoline 63–220° C. |
|---|---|---|---|
| Refraction index at 20° C. | 1.43 | 1.38 | 1.45 |
| Density 15/4 | 0.76 | 0.67 | 0.79 |
| Bromine index (gBr/100 g) | 78 | 166 | 48 |
| MAV (mg/g) | 6.4 | 5.2 | 6.8 |
| Total nitrogen (mg/l) | 40 | 2.7 | 50 |
| Research octane number | 93.0 | 95.8 | 92.0 |
| Motor octane number | 80.3 | 84.1 | 78.9 |
| Sulfur except for mercaptans (mg/Kg) | 1509 | 37 | 2000 |
| Mercaptans (mg/kg) | 58 | 158 | 24 |
| Total sulfur (mg/Kg) | 1567 | 195 | 2024 |

These results show that the light gasoline contains a high diolefin content, which can necessitate a hydrogenation post-treatment before its use and mainly a sulfur content in the form of mercaptans which requires an essential additional treatment before its use.

EXAMPLE 2

The gasoline that is obtained from a catalytic cracking unit whose characteristics are described in Example 1 is subjected to a hydrogenation treatment of the diolefins under conditions where the light sulfur-containing compounds that are present in the feedstock are partly converted into heavier compounds (simultaneous stages a1 and a2).

This treatment is carried out in a reactor that operates continuously and with an upward flow. The catalyst has a nickel and molybdenum base (catalyst HR945 that is marketed by the Procatalyse Company). The reaction is carried out at 160° C. under a total pressure of 1.3 MPa, with a volumetric flow rate of 6 $h^{-1}$. The H2/feedstock ratio, expressed in liter of hydrogen per liter of feedstock, is 10.

The characteristics of the effluent after the diolefins are hydrogenated and conversion of the light compounds that are present in the gasoline are indicated in Table 2.

TABLE 2

|  | Starting Gasoline | Gasoline After Hydrogenation (Stages a1 and a2) |
|---|---|---|
| Refraction index at 20° C. | 1.44 | 1.43 |
| Density 15/4 | 0.78 | 0.77 |
| Bromine index (gBr/100 g) | 78 | 75.5 |
| MAV (mg/g) | 6.4 | 0.2 |
| Total nitrogen (mg/l) | 40 | 40 |
| Research octane number | 93.0 | 92.2 |
| Motor octane number | 80.3 | 79.9 |
| Sulfur except for mercaptans (mg/Kg) | 1509 | 1561 |
| Mercaptans (mg/kg) | 58 | 6 |
| Total sulfur (mg/Kg) | 1567 | 1567 |

At the end of this treatment, the gasoline is separated into two reaction under the conditions that are described in Example 1 (stage b).

TABLE 3

|  | Starting Gasoline | Light Fraction PI-63 | Heavy Fraction 63–220° C. |
|---|---|---|---|
| Refraction index at 20° C. | 1.44 | 1.38 | 1.45 |
| Density 15/4 | 0.78 | 0.67 | 0.79 |
| Bromine index (gBr/100 g) | 75.5 | 158 | 48 |
| MAV (mg/g) | 0.2 | 0.0 | 0.3 |
| Total nitrogen (mg/l) | 4.0 | 2.7 | 50 |
| Research octane number | 92.2 | 92.8 | 92.0 |
| Motor octane number | 79.9 | 82.9 | 78.9 |
| Sulfur except for mercaptans (mg/Kg) | 1561 | 31 | 2071 |
| Mercaptans (mg/kg) | 6 | 2 | 7 |
| Total sulfur (mg/Kg) | 1567 | 33 | 2078 |

At the end of this separation, the light gasoline has a content of sulfur, mercaptan and diolefin such that it is no longer necessary to carry out an additional treatment of this fraction before using it.

The heavy gasoline is subjected to hydrodesulfurization on a scheme of catalysts in an isothermal tubular reactor.

The first catalyst (catalyst A, stage c) is obtained by impregnation "without excess solution" of a transition alumina that comes in the form of balls with a specific surface area of 130 m2/g and a pore volume of 0.9 ml/g, by an aqueous solution that contains molybdenum and cobalt in the form of ammonium heptamolybdate and cobalt nitrate. The catalyst is then dried and calcined under air at 500° C. The content of cobalt and molybdenum of this sample is 3% of CoO and 14% of MoO3.

The second catalyst (catalyst B, stage d) is prepared from a transition alumina of 140 $m^2/g$ that comes in the form of balls with a diameter of 2 mm. The pore volume is 1 ml/g of substrate. 1 kilogram of substrate is impregnated by 1 liter of nickel nitrate solution. The catalyst is then dried at 120° C. and calcined under a flow of air at 400° C. for one hour. The nickel content of the catalyst is 20% by weight.

25 ml of catalyst A, and 50 ml of catalyst B are placed in the same hydrodesulfurization reactor so that the feedstock that is to be treated (heavy fraction) first encounters catalyst A (stage c) then catalyst B (stage d). A zone for sampling the effluent that is obtained from stage c is provided between catalysts A and B. The catalysts are first sulfurized by treatment for 4 hours under a pressure of 3.4 MPa at 350° C., with contact of a feedstock that consists of 2% sulfur in the form of dimethyl disulfide in n-heptane.

The operating conditions of the hydrodesulfurization are as follows: VVH=1.33 $h^{-1}$ relative to the entire catalyst bed $H_2$/HC=400 l/l, P=2.0 MPa. The temperature of the catalytic zone that comprises catalyst A is 240° C., whereby the temperature of the catalytic zone that contains catalyst B is 330° C.

The characteristics of the effluents that are thus obtained are presented in Table 4.

TABLE 4

Characteristics of the Heavy Gasoline after Hydrodesulfurization

|  | Heavy Gasoline | Partially Desulfurized Heavy Gasoline (stage c) | Totally Desulfurized Heavy Gasoline (stage d) |
|---|---|---|---|
| Total S (ppm) | 2078.0 | 539.0 | 122.0 |
| S RSH (ppm) | 7.0 | 323.0 | 31.0 |
| Bromine index (gBr/100 g) | 48.0 | 36.0 | 34.5 |
| RON | 92.0 | 87.2 | 87.1 |
| MON | 78.9 | 76.3 | 76.5 |
| $H_2S$ (% by Vol.) |  | 0.14 | 0.18 |

The desulfurized heavy gasoline and the light gasoline are then remixed to constitute a total desulfurized gasoline whose composition is given in Table 5.

TABLE 5

|  | Starting Gasoline | Total Desulfurized Gasoline |
|---|---|---|
| Refraction index at 20° C. | 1.44 | 1.43 |
| Density 15/4 | 0.78 | 0.76 |
| Bromine index (gBr/100 g) | 78 | 65.5 |
| MAV (mg/g) | 6.4 | 0.0 |
| Total nitrogen (mg/l) | 40 | 20 |
| Research octane number | 93.0 | 90.8 |
| Motor octane number | 80.3 | 79.5 |
| Sulfur except for mercaptans (mg/Kg) | 1509 | 77 |
| Mercaptans (mg/kg) | 58 | 23 |
| Total sulfur (mg/Kg) | 1567 | 100 |

EXAMPLE 3

The heavy gasoline that is obtained in Example 2 is subjected to hydrodesulfurization on the scheme of catalysts A and B that is described in Example 2, in an isothermal tubular reactor.

25 ml of catalyst A, and 50 ml of catalyst B, are placed in the hydrodesulfurization reactor. The catalysts are first sulfurized by treatment for 4 hours under a pressure of 3.4 Mpa at 350° C., upon contact with a feedstock that consists of 2% sulfur in the form of dimethyl disulfide in n-heptane.

The operating conditions of the hydrodesulfurization are as follows: VVH=1.33 $h^{-1}$ relative to the entire catalyst bed $H_2$/HC=400 l/l, P=2.0 MPa. The temperature of the catalytic zone that comprises catalyst A is 260° C., whereby the temperature of the catalytic zone that contains catalyst B is 290° C.

The characteristics of the effluents that are thus obtained are presented in Table 6.

TABLE 6

Characteristics of the Heavy Gasoline after Hydrodesulfurization

|  | Heavy Fraction | Partially Desulfurized Heavy Fraction (stage c) | Totally Desulfurized Heavy Fraction (stage d) |
|---|---|---|---|
| Total S (ppm) | 2078.0 | 252.0 | 150.0 |
| S RSH (ppm) | 7.0 | 151.0 | 55.0 |

TABLE 6-continued

Characteristics of the Heavy Gasoline after Hydrodesulfurization

|  | Heavy Fraction | Partially Desulfurized Heavy Fraction (stage c) | Totally Desulfurized Heavy Fraction (stage d) |
| --- | --- | --- | --- |
| Bromine index (gBr/100 g) | 48.0 | 32.1 | 31.2 |
| RON | 92.0 | 87.3 | 87.1 |
| MON | 78.9 | 76.5 | 76.4 |
| $H_2S$ (% by vol.) |  | 0.17 | 0.18 |

The desulfurized heavy gasoline and the light gasoline are then remixed to constitute a total desulfurized gasoline whose composition is given in Table 7.

TABLE 7

|  | Starting Gasoline | Total Desulfurized Gasoline |
| --- | --- | --- |
| Refraction index at 20° C. | 1.44 | 1.43 |
| Density 15/4 | 0.8 | 0.76 |
| Bromine index (gBr/100 g) | 78 | 62.9 |
| MAV (mg/g) | 6.4 | 0.0 |
| Total nitrogen (mg/l) | 40 | 150 |
| Research octane number | 93.0 | 90.1 |
| Motor octane number | 80.3 | 78.9 |
| Sulfur except for mercaptans (mg/Kg) | 1509 | 79 |
| Mercaptans (mg/kg) | 58 | 42 |
| Total sulfur (mg/Kg) | 1567 | 121 |

Definitions

Throughout the specification and claims, the term "starting gasoline" means the sulfur-containing feedstock entering stage (a).

The term "olefins" in streams downstream of hydrogenation stage (a1) means mono-olefins with trace amounts, generally less than 300 ppm, of residual diolefins. Conversely, the term "olefins" in streams upstream of stage (a1) means a mixture of substantial quantities of higher olefins, e.g. diolefins, along with varying amounts of mono-olefins.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/10.653, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of gasoline with a low sulfur content that comprises at least the following stages:
   a1) at least a selective hydrogenation of diolefins that are present in the starting gasoline,
   b) at least one separation of the gasoline that is obtained in stage a1 in two fractions, a light gasoline that is virtually lacking in sulfur and that contains the lightest olefins of the starting gasoline in which the majority of the sulfur-containing compounds that are initially present in the starting gasoline is concentrated,
   c) at least one treatment of the heavy gasoline that is separated in stage b on a catalyst that makes it possible to decompose or to hydrogenate at least partially unsaturated sulfur-containing compounds present in the gasoline, under conditions where the hydrogenation of the olefins on this catalyst is limited,
   d) at least one treatment of the heavy gasoline that is obtained in stage c, without eliminating the $H_2S$ that is formed during this stage, on a catalyst that makes it possible to decompose the unsaturated sulfur-containing compounds that are not transformed in c, with a limited hydrogenation of olefins.

2. A process according to claim 1 that also comprises at least one stage a2 that is aimed at increasing the molecular weight of light sulfur-containing products that are present in the gasoline.

3. A process according to claim 1 further comprising at least one stage a2 comprising increasing the molecular weight of the light sulfur-containing products present in the gasoline simultaneously with a1 in the same reactor and on the same catalyst as a1.

4. A process according to claim 1, wherein the light gasoline does not undergo additional post-treatment.

5. A process according to claim 1, wherein the light gasoline undergoes an extractive sweetening.

6. A process according to claim 1, wherein the heavy gasoline desulfurized in stages c and d is stripped with an inert gas.

7. A process according to claim 1 wherein stages c and d are carried out in at least two different reactors.

8. A process according to claim 1, wherein the light gasoline and the heavy gasoline are mixed after treatment.

9. A process according to claim 2 wherein the catalyst of stages a1 and a2 d comprise at least one metal of group VIII and the catalyst of stage c comprises at least one element selected from the group consisting of the elements of Group VIII and the elements of group VIb.

10. A process according to claim 9, wherein one and the same catalyst is used for stages a1 and a2.

11. A process according to claim 9, in which the catalysts that are used in stages c and d are sulfurized.

12. A process according to claim 1, wherein stages c and d are carried out in two reactors placed in series, whereby the second reactor integrally treats the effluent of the first reactor.

13. A process according to claim 2 wherein stages c and d are carried out in two reactors placed in series, whereby the second reactor integrally treats the effluent of the first reactor and wherein the catalysts of stages a1, a2, and d comprise at least one element of group VIII, and the catalyst of stage c comprises at least one element selected from the group consisting of the elements of group VIII and the elements of group VIb.

14. A process according to claim 13 wherein one and the same catalyst is used for stages a1 and a2.

15. A process for the production of gasoline with a low sulfur content that comprises at least the following stages:
   a1) at least selective hydrogenation of diolefins that are present in the starting gasoline,
   a2) after stage a1 and before stage b at least one stage a2 comprising increasing the molecular weight of light sulfur-containing products present in the gasoline,
   b) at least one separation of the gasoline that is obtained in stage a1 in two fractions, a light gasoline that is virtually lacking in sulfur and that contains the lightest olefins of the starting gasoline, and a heavy gasoline in which the majority of the sulfur-containing compounds that are initially present in the gasoline is concentrated, c) at least one treatment of the heavy gasoline that is separated in stage b on a catalyst that makes it possible to decompose or to hydrogenate at least partially unsaturated sulfur-containing compounds present in the gasoline, under conditions where the hydrogenation of olefins present in the gasoline on this catalyst is incomplete, d) at least one treatment of the heavy gasoline that is obtained in stage c, without eliminating the $H_2S$ that is formed during this stage, on a catalyst that makes it possible to decompose the unsaturated sulfur-containing compounds that are not transformed in c, with a limited hydrogenation of olefins.

16. A process for the production of gasoline with a low sulfur content that comprises at least the following stages:

a) at least a selective hydrogenation of diolefins that are present in the starting gasoline, b) at least one separation of the gasoline that is obtained in stage a1 in two fractions, a light gasoline that is virtually lacking in sulfur and that contains the lightest olefins of the starting gasoline, and a heavy gasoline in which the majority of the sulfur-containing compounds that are initially present in the gasoline is concentrated, c) at least one treatment of the heavy gasoline that is separated in stage b on a catalyst that makes it possible to decompose or to hydrogenate at least partially unsaturated sulfur-containing compounds present in the gasoline, under conditions where the hydrogenation of olefins present in the gasoline on this catalyst is incomplete, d) at least one treatment of the heavy gasoline that is obtained in stage c, without eliminating the $H_2S$ that is formed during this stage, on a catalyst that makes it possible to decompose the unsaturated sulfur-containing compounds that are not transformed in c, with a limited hydrogenation of olefins, wherein $H_2S$ formed during stage c is not eliminated before stage d and $H_2S$ content is not adjusted between stage c and d.

17. A process according to claim 13 wherein the same catalyst is used for stages a1 and a2.

18. A process according to claim 1, wherein the unsaturated sulfur-containing compounds that are not transformed in c are preferably the linear and or cyclic saturated sulfur-containing compounds.

19. A process according to claim 1, wherein the catalysts used in c and d are different.

* * * * *

UNITED STATES PATENT AND TRADEMARK OFFICE
CERTIFICATE OF CORRECTION

PATENT NO.     : 6,896,795 B2
DATED          : May 24, 2005
INVENTOR(S)    : Blaise Didillon et al.

It is certified that error appears in the above-identified patent and that said Letters Patent is hereby corrected as shown below:

Column 18,
Line 2, reads "gasoline in which" should read -- gasoline, and a heavy gasoline in which --.
Line 36, reads "catalyst" should read -- catalysts --.
Line 37, reads "a2 d comprise" should read -- a2 and d comprise --.
Line 37, reads "VIII" should read -- VIII, --.
Line 61, reads "at least selective" should read -- at least a selective --.

Column 19,
Line 21, reads "a)" should read -- a1) --.

Signed and Sealed this

Fourth Day of October, 2005

JON W. DUDAS
*Director of the United States Patent and Trademark Office*